(12) United States Patent
Oya

(10) Patent No.: US 6,421,098 B1
(45) Date of Patent: Jul. 16, 2002

(54) METHOD AND APPARATUS FOR CHANGING AUTOMATIC GAIN CONTROL POINTS OF DIGITAL TELEVISION SIGNALS

(75) Inventor: Koichi Oya, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/521,800

(22) Filed: Mar. 9, 2000

(30) Foreign Application Priority Data

Mar. 12, 1999 (JP) .............................. 11-066633

(51) Int. Cl.$^7$ .......................... H04N 5/52; H04N 5/268
(52) U.S. Cl. ........................... 348/678; 348/705
(58) Field of Search ............................... 348/678, 679, 348/685, 255, 558, 705, 706, 725, 726, 731, 733, 735, 553, 554, 555; 455/136, 138, 234.1, 239.1, 241.1, 242.1, 242.2, 246.1, 247.1; 375/345; H04N 5/52, 5/268

(56) References Cited

U.S. PATENT DOCUMENTS 5,268,761 A * 12/1993 White ....................... 348/678
5,410,368 A * 4/1995 Krishnamurthy et al. ... 348/726
5,565,932 A * 10/1996 Citta et al. .................. 348/678

* cited by examiner

Primary Examiner—Sherrie Hsia
(74) Attorney, Agent, or Firm—Lerner, David, Littenberg, Krumholz & Mentlik, LLP

(57) ABSTRACT

Optimal RF AGC points are individually set for a terrestrial digital television signal and a CATV digital signal. A switch is changed according to whether an input signal is a terrestrial digital television signal or a CATV digital signal. If the terrestrial digital television signal is input, the voltage for setting the RF AGC point is set to a reference voltage $V_1$ output from a first reference power supply source. If the CATV digital signal is input, the voltage for setting the RF AGC point is set to a reference voltage $V_2$ output form a second reference power supply source. A comparator then outputs an RF AGC signal according to a difference between an IF AGC signal and the reference voltage.

9 Claims, 3 Drawing Sheets

METHOD AND APPARATUS FOR CHANGING AUTOMATIC GAIN CONTROL POINTS OF DIGITAL TELEVISION SIGNALS

BACKGROUND OF THE INVENTION

1. Field of the Invention

The present invention relates to a method and an apparatus for receiving digital television signals. More particularly, the invention relates to a digital television signal receiving apparatus in which optimal automatic gain control (AGC) points are individually set for a terrestrial digital television signal and a cable television (CATV) digital signal by switching the AGC points according to the type of input digital television signal. The invention also pertains to a digital television signal receiving method for use in the above type of apparatus.

2. Description of the Related Art

Digital television signal receiving apparatuses are coming into wide and general use. A tuner of a digital television signal receiving apparatus is provided with AGC circuits for detecting changes of the amplitude of an input signal and for keeping the amplitude of an output signal constant.

The AGC circuits for use in the digital television signal receiving apparatus are grouped into two types: one type is an AGC circuit for a radio frequency (RF) signal receiving apparatus, and the other type is an AGC circuit for an intermediate frequency (IF) signal receiving apparatus. In the RF AGC circuit, the gain of an RF signal received from an antenna is controlled. In the IF AGC circuit, the gain of an IF signal converted from an RF signal is controlled.

Normally, the IF AGC operation is first conducted, and when the input level of the tuner becomes constant, the RF AGC operation is conducted. The reason for this is as follows. The IF signal is first controlled so that an image with a good signal-to-noise (S/N) or carrier-to-noise (C/N) ratio can be obtained with the highest level of sensitivity of the tuner. Then, the RF signal is controlled so that the gain of the tuner is suppressed so as to prevent cross modulation distortions.

FIG. 1 illustrates a conventional AGC circuit for controlling an RF AGC point. A reference voltage $V_0$ output from a reference power supply source 2 is input into an inverting input terminal of a comparator 1 shown in FIG. 1, while an IF AGC signal is input into a non-inverting input terminal of the comparator 1 from a circuit (not shown) subsequent to this AGC circuit.

The comparator 1 then compares the IF AGC signal input into the non-inverting input terminal with the reference voltage $V_0$ input from the reference power supply source 2. Upon comparison, as shown in FIG. 2, if the voltage of the IF AGC signal is equal to or higher than the reference voltage $V_0$, an RF AGC signal with a constant high level is output. If the voltage of the IF AGC signal is lower than the reference voltage $V_0$, an RF AGC signal with a gradually reduced voltage level is output.

When the output voltage of the RF AGC signal from the comparator 1 starts to be reduced, a tuner (not shown) assumes that an IF signal having an adequate magnitude has been obtained in a circuit (not shown) subsequent to the comparator 1 and begins to control the level of the RF signal to be output. That is, when the voltage of the IF AGC signal reaches the reference voltage $V_0$, the AGC point is set (the point at which the RF AGC operation is performed).

Generally, concerning terrestrial signals, although the interruption level may become higher than that of a desired signal, the noise level is much the same as the thermal noise level. In contrast, regarding the CATV signals, the interruption level is not very high, but the noise level is higher than the thermal noise level.

When, for example, the bandwidth is 6 MHz, the thermal noise level is −106 dBm. When the noise figure (NF) of the tuner is 7 dB, and the C/N ratio required for an output of the tuner is 25 dB, the AGC (RF AGC) point of the tuner when terrestrial signals are received is calculated according to equation (1) below. In calculating the AGC points, the S/N ratio and the C/N ratio are treated equally considering that they are the ratios of the input level of terrestrial signals and CATV signals, respectively, to the noise level.

$$-106+7+25=-74 \text{ dBm} \tag{1}$$

In setting the AGC point of the tuner when receiving CATV RF signals, when, for example, the input RF signal level is −55 dBm and the corresponding C/N ratio is 27 dB, the noise level becomes −82(=−55−27) dBm. Since the level of the input RF signal is lower than the AGC point expressed by equation (1), i.e., −74 dBm, the AGC operation is conducted on the input RF signal by an amount of gain, i.e., 19(=−55−(−74)) dB, by which the input level is reduced from the AGC point. However, an AGC operation is performed also on the NF, and the NF results in 26 (=19+7) dB. In this case, the output of the tuner C/N(TUNER OUT) can be calculated by equation (2) below:

$$C/N(\text{TUNER OUT})=10\text{Log}(Ci/(Ni+(NF-1)kTB)) \tag{2}$$

where Ci indicates the level of the input RF signal (true value) of the tuner; Ni represents the input noise level (true value) of the tuner; k is the Boltzmann constant (=1.38×10⁻²³ JK⁻¹); T is the absolute temperature (300 K); and B represents the bandwidth (6 MHz). Ci, Ni, and NF can be determined by the following equations.

$$ci=10^{((-55-30)/10)}≈3.2\times10^{-9} \tag{3}$$

$$Ni=10^{((-82-30)/10)}≈6.3\times10^{-12} \tag{4}$$

$$NF=10^{(26/10)}≈400 \tag{5}$$

By substituting the above-described values and the calculation results of equations (3) through (5) into equation (2), the following equation (6) can be obtained.

$$C/N(\text{TUNER OUT})=10\text{Log}((3.2\times10^{-9})/((6.3\times10^{-12})+(400-1)\times (1.38\times10^{-31\ 23})\times300\times(6\times10^6)))=10\text{Log}(197.5)≈23 \text{ (dB)} \tag{6}$$

The resulting value obtained by equation (6) is smaller than the output C/N=25 dB required for the tuner by 2 dB.

Thus, as stated above, in receiving the terrestrial RF signal, it is necessary to increase the AGC point to obtain a higher sensitivity in order to reduce cross modulation distortions. In other words, the AGC point must be set so that the AGC circuit is operated even if the input RF signal is reduced only by a smaller amount. In contrast, in receiving the CATV RF signal, since the noise level thereof is higher than that of the terrestrial signal, it is necessary to reduce the AGC point to obtain a lower sensitivity compared to that of the terrestrial signal in order to receive the RF signal with a good C/N ratio. In other words, the AGC point must be set so that the AGC circuit is operated when the input RF signal is reduced by a greater level. It is thus difficult to individually set optimal AGC points for the above two types of signals, i.e., the terrestrial signal and the CATV signal.

SUMMARY OF THE INVENTION

Accordingly, in view of the above background, it is an object of the present invention to individually set optimal AGC points for a terrestrial digital television signal and a CATV digital signal.

In order to achieve the above object, according to one aspect of the present invention, there is provided a digital signal receiving apparatus for receiving a first signal and a second signal. The digital signal receiving apparatus includes a setting unit for individually setting an AGC point for the first signal and an AGC point for the second signal, and a switching unit for switching between the AGC points set by the setting unit according to whether an input signal is the first signal or the second signal.

According to another aspect of the present invention, there is provided a digital signal receiving apparatus for receiving a digital terrestrial broadcast and a digital cable television broadcast. The digital signal receiving apparatus includes a tuner provided with a first AGC circuit controlled by a first control signal. The tuner converts an RF signal of one of the digital terrestrial broadcast and the digital CATV broadcast into an IF signal and outputs the IF signal. A second AGC circuit controls the level of the IF signal supplied from the tuner based on a second control signal. A processing circuit processes an output signal of the second AGC circuit and also generates the second control signal. A control circuit controls the level of the first control signal based on a result of comparison between the second control signal and a reference signal. A switching circuit switches the level of the reference signal according to whether the digital terrestrial broadcast or the digital CATV broadcast is received.

According to still another aspect of the present invention, there is provided a digital signal receiving method for use in a digital signal receiving apparatus for receiving a first signal and a second signal. The digital signal receiving method includes a setting step of individually setting an AGC point for the first signal and an AGC point for the second signal, and a switching step of switching between the AGC points set in the setting step according to whether an input signal is the first signal or the second signal.

With this arrangement, the AGC points are individually set for the first signal and the second signal and are switched according to whether an input signal is the first signal or the second signal. It is thus possible to set optimal AGC points for the first signal and the second signal.

DESCRIPTION OF THE PREFERRED EMBODIMENT

Figure 1:
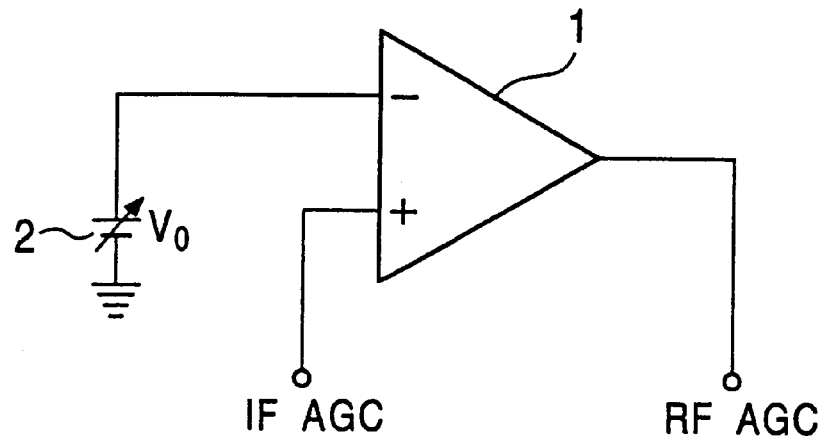
FIG. 1 illustrates the configuration of a conventional circuit for setting RF AGC points.
Figure 2:
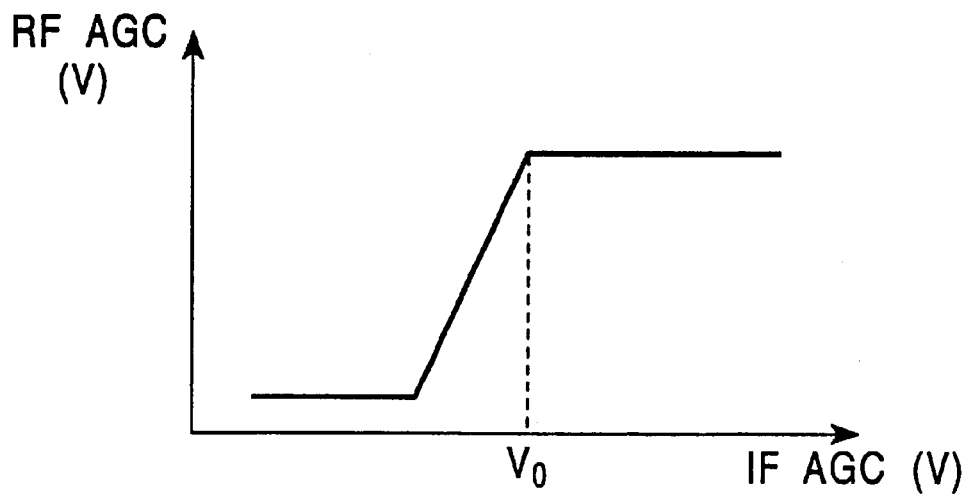
FIG. 2 illustrates input/output characteristics of the circuit shown in FIG. 1.
Figure 3:
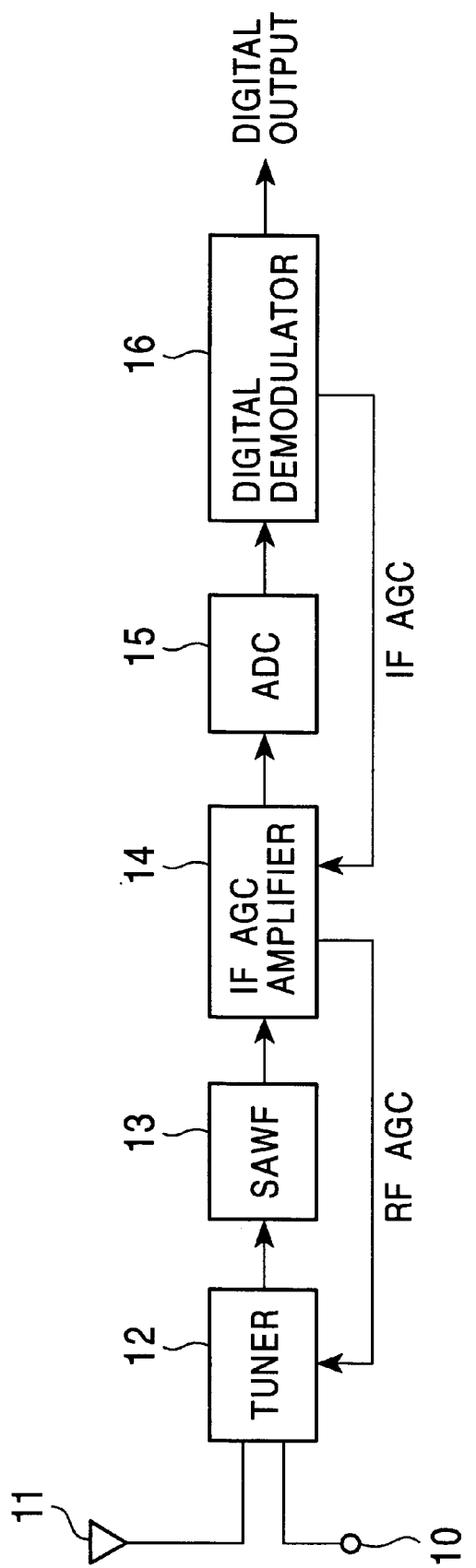
FIG. 3 is a block diagram illustrating the configuration of a digital television signal receiving apparatus incorporating the present invention.

FIG. 3 illustrates the configuration of a digital television signal receiving apparatus incorporating the present invention. An antenna 11 receives a terrestrial digital television signal as an RF signal and outputs it to a tuner 12. A CATV digital signal is also input into the tuner 12 from a terminal 10. The tuner 12 then converts the RF digital signal received from the antenna 11 into a predetermined constant IF signal, and outputs the IF signal to a surface acoustic wave filter (SAWF) 13.

The SAWF 13 permits only a predetermined frequency signal component from the received IF signal to pass. An IF AGC amplifier 14 converts the input IF signal to a predetermined level and outputs it to an analog-to-digital converter (ADC) 15.

The ADC 15 converts the analog IF signal input from the IF AGC amplifier 14 into a digital IF signal, and outputs it to a digital demodulator 16. The digital demodulator 16 demodulates the input digital signal into an image signal and outputs it to a subsequent circuit (not shown).

The operation of the above-configured digital television signal receiving apparatus is as follows. A terrestrial digital television signal or a CATV digital signal received as an RF signal from the antenna 11 or the terminal 10, respectively, is converted into an IF signal having a predetermined frequency in the tuner 12. Simultaneously, the tuner 12 controls the gain of the IF signal based on an RF AGC signal transmitted from the IF AGC amplifier 14 and outputs the IF signal to the SAWF 13.

The SAWF 13 extracts only a signal component having a desired frequency from the received IF signal and outputs it to the IF AGC amplifier 14. The IF AGC amplifier 14 amplifies the input IF signal to a predetermined level and outputs it to the ADC 15. The gain of the output signal from the IF AGC amplifier 14 is controlled based on an IF AGC signal output from the digital demodulator 16.

The ADC 15 converts the received analog signal into a digital signal, and outputs it to the digital demodulator 16. The digital demodulator 16 demodulates the received digital signal into an image signal and outputs it to a subsequent circuit (not shown). The digital demodulator 16 also outputs the IF AGC signal to the IF AGC amplifier 14.

As described above, in the digital television signal receiving apparatus, the tuner 12 performs the RF AGC operation based on the RF AGC signal sent from the IF AGC amplifier 14, and also, the IF AGC amplifier 14 performs the IF AGC operation based on the IF AGC signal sent from the digital demodulator 16.

The IF AGC operation is first conducted, and when the input level of the tuner 12 becomes constant, the RF AGC operation is conducted. The reason for this is as follows. The IF signal is first controlled so that an image with a good SIN or C/N ratio can be obtained with the highest level of sensitivity of the tuner 12. Then, the RF signal is controlled so that the gain of the tuner 12 is suppressed so as to prevent cross modulation distortions.

Figure 4:
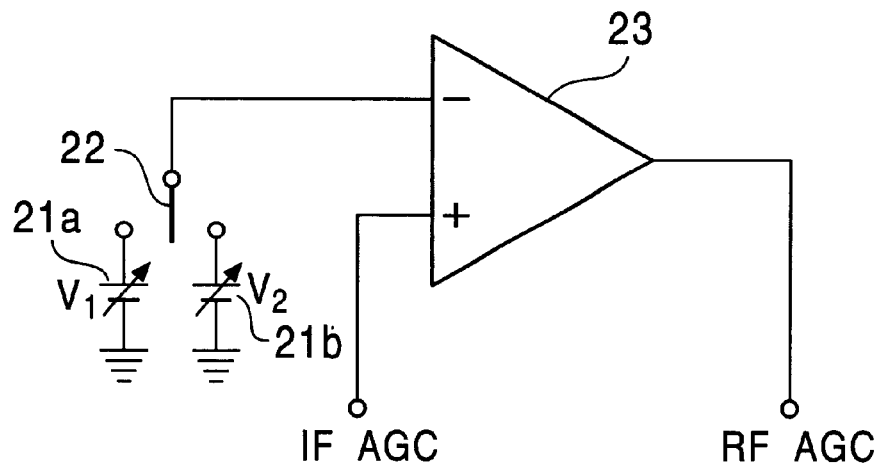
FIG. 4 illustrates the configuration of a circuit for setting RF AGC points incorporating the present invention.

FIG. 4 illustrates the configuration of a circuit for controlling RF AGC points, which is built into the IF AGC amplifier 14. The IF AGC signal from the digital demodulator 16 is input into a non-inverting input terminal of a comparator 23. A reference voltage $V_1$ or $V_2$ is respectively input into an inverting input terminal of the comparator 23 from a reference power supply source 21a or 21b via a changeover switch 22. A signal output from an output terminal of the comparator 23 is output to the tuner 12 as the RF AGC signal.

The reference voltages $V_1$ and $V_2$ ($V_1 > V_2$) from the reference power supply sources 21a and 21b are respectively used for setting the AGC points when a terrestrial signal and a CATV signal are received. The reference voltage $V_1$ is set to be greater than the reference voltage $V_2$.

The IF AGC amplifier 14 receives from a microcomputer 24 a signal indicating that the input signal is a terrestrial digital television signal or a CATV digital signal. If the input signal is found to be a terrestrial signal, the IF AGC amplifier 14 connects the changeover switch 22 to the voltage power supply source 21a. If the input signal is found to be a CATV signal, the IF AGC amplifier 14 connects the changeover switch 22 to the voltage power supply source 21b. That is, by using the switch 22, the two setting voltages (RF AGC points) can be switched.

A description is given below of the operation of the above-configured circuit for controlling the RF AGC point in receiving a terrestrial signal. Upon receiving from a microcomputer the signal indicating that the input signal is a terrestrial digital signal, the IF AGC amplifier 14 connects the changeover switch 22 to the voltage power supply source 21a so as to input the reference voltage $V_1$ into the inverting input terminal of the comparator 23. The IF AGC signal output from the digital demodulator 16 is input into the non-inverting input terminal of the comparator 23.

Figure 5:
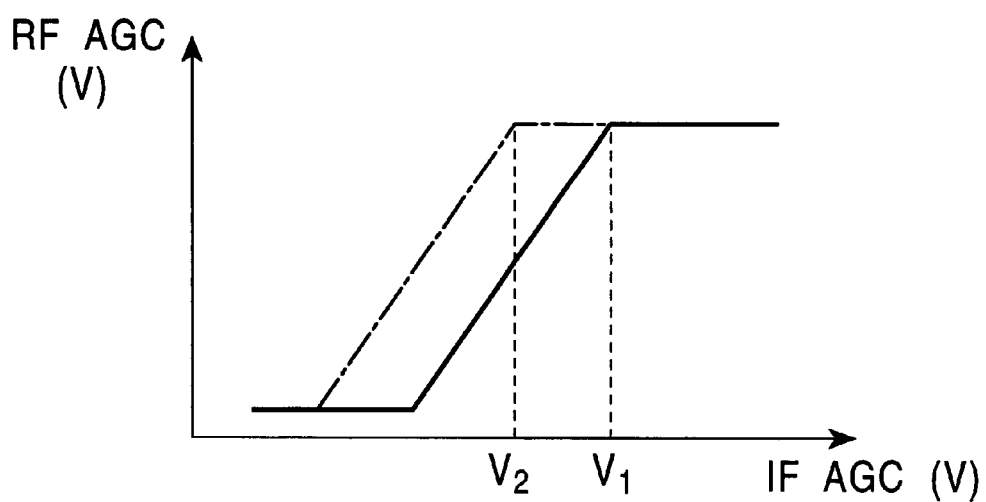
FIG. 5 illustrates input/output characteristics of the circuit shown in FIG. 4.

The comparator 23 then compares the reference voltage $V_1$ input into the inverting input terminal with the IF AGC signal voltage (level) input into the non-inverting input terminal. If the IF AGC signal voltage is equal to or higher than the reference voltage $V_1$, an RF AGC signal with a constant high level is output, as indicated by the solid line shown in FIG. 5. If the IF AGC signal voltage is lower than the reference voltage $V_1$, an RF AGC signal with a gradually reduced level is output according to the voltage level of the IF AGC signal.

The resulting RF AGC signal is output to the tuner 12, which then controls the gain of an IF signal to be output based on the RF AGC signal.

When the tuner 12 receives a CATV digital signal, the changeover switch 22 is connected to the voltage power supply source 22b, and the reference voltage $V_2$ is compared with the IF AGC signal. The subsequent processing is similar to that discussed above.

The reference voltages $V_1$ and $V_2$ output from the voltage power supply sources 21a and 21b are discussed in detail below.

When the bandwidth is set to, for example, 6 MHz, the thermal noise level is −106 dBm. When the NF of the tuner 12 is 7 dB, and the C/N ratio required for the tuner 12 is 25 dB, the AGC (RF AGC) point of the tuner 12 while receiving a terrestrial signal is calculated according to equation (7) below in a manner similar to equation (1).

$$-106+7+25=-74 \text{ dBm} \qquad (7)$$

Consequently, in receiving a terrestrial digital television signal, the reference voltage $V_1$ of the voltage power supply source 21a is set to a voltage (AGC point) which satisfies the level of the input RF signal, i.e., −74 dBm.

On the other hand, in receiving a CATV RF signal, when, for example, the input RF signal level is −55 dBm, and the corresponding C/N ratio is 27 dB, the noise level results in −82(=−55−27) dBm. The output of the tuner 12 C/N (TUNER OUT) can be determined by the aforementioned equation (2). In this case, Ci, Ni, and NF can be obtained according to the following equations (8) through (10).

$$Ci=10^{((-55-30)/10))} \approx 3.2 \times 10^{-9} \qquad (8)$$

$$Ni=10^{((-82-30)/10))} \approx 6.3 \times 10^{-12} \qquad (9)$$

$$NF=10^{(7/10)} \approx 5 \qquad (10)$$

By substituting the above-described values and the calculation results of equations (8) through (10) into equation (2), the following equation (11) can be obtained.

$$C/N(\text{TUNER OUT})=10\text{Log}((3.2\times10^{-9})/((6.3\times10^{-12})+(5-1)\times(1.38\times10^{-23})\times300\times(6\times10^{6})))=10\text{Log}(500)\approx27 \text{ (dB)} \qquad (11)$$

According to equation (11), by setting the voltage $V_2$ of the voltage power supply source 21b to the RF AGC point to satisfy the input RF signal, i.e., −55 dBm, the C/N (TUNER OUT) required for the tuner 12, i.e., 25 dB, can be met.

Accordingly, in this example, the reference voltage $V_1$ for receiving a terrestrial digital television signal and the reference voltage $V_2$ for receiving a CATV signal are set to satisfy the input RF signals, i.e., −74 dBm and −55 dBm, respectively.

The reference voltage $V_2$ (indicated by the one-dot-chain line shown in FIG. 5) for receiving a CATV digital signal is set lower than the reference voltage $V_1$ (indicated by the solid line shown in FIG. 5) for receiving a terrestrial digital television signal. It is thus possible to set the RF AGC points so that the RF AGC operation is less likely to be conducted on a CATV signal than a terrestrial television signal.

As discussed above, in the digital television signal receiving apparatus, different RF AGC points can be set for a terrestrial digital television signal and a CATV digital signal. It is thus possible to set optimal RF AGC points according to the type of input signal.

In the foregoing embodiment, the RF AGC points are set for receiving two types of signals, i.e., a terrestrial wave signal and a CATV signal. If there are more than the above two types of television signals whose input level is different from the noise level, a corresponding number of voltage power supply sources may be provided and switched by the changeover switch 22, so that a corresponding number of RF AGC points can be set.

Providing media for providing a computer program implementing the above-described processing may include recording media, such as a magnetic disk, a CD-ROM, and a solid-state memory, and communication media, such as a network or a satellite.

What is claimed is:

1. A digital signal receiving apparatus for receiving a first signal and a second signal, comprising:
   setting means for individually setting an automatic gain control point for the first signal and an automatic gain control point for the second signal; and
   switching means for switching between the automatic gain control points set by said setting means according to whether an input signal is the first signal or the second signal.

2. A digital signal receiving apparatus according to claim 1, wherein the first signal and the second signal comprise a terrestrial digital television signal and a cable television digital signal, respectively.

3. A digital signal receiving apparatus according to claim 2, wherein the automatic gain control point for the cable television digital signal is set lower than the automatic gain control point for the terrestrial digital television signal.

4. A digital signal receiving apparatus for receiving a digital terrestrial broadcast and a digital cable television broadcast, comprising:
   a tuner provided with a first automatic gain control circuit controlled by a first control signal, said tuner for converting a radio frequency signal of one of the digital terrestrial broadcast and the digital cable television broadcast into an intermediate frequency signal and for outputting the intermediate frequency signal;
   a second automatic gain control circuit for controlling a level of the intermediate frequency signal supplied from said tuner based on a second control signal;

a processing circuit for processing an output signal of said second automatic gain control circuit and also for generating the second control signal;

a control circuit for controlling a level of the first control signal based on a result of comparison between the second control signal and a reference signal; and a switching circuit for switching a level of the reference signal according to whether the digital terrestrial broadcast or the digital cable television broadcast is received.

5. A digital signal receiving apparatus according to claim 4, wherein said control circuit is disposed within said second automatic gain control circuit.

6. A digital signal receiving apparatus according to claim 4, wherein said switching circuit comprises a microcomputer.

7. A digital signal receiving method for use in a digital signal receiving apparatus for receiving a first signal and a second signal, said method comprising:

a setting step of individually setting an automatic gain control point for the first signal and an automatic gain control point for the second signal; and a switching step of switching between the automatic gain control points set in said setting step according to whether an input signal is the first signal or the second signal.

8. A digital signal receiving method according to claim 7, wherein the first signal and the second signal comprise a terrestrial digital television signal and a cable television digital signal, respectively.

9. A digital signal receiving method according to claim 8, wherein the automatic gain control point for the cable television digital signal is set lower than the automatic gain control point for the terrestrial digital television signal.

* * * * *

UNITED STATES PATENT AND TRADEMARK OFFICE
CERTIFICATE OF CORRECTION

PATENT NO. : 6,421,098 B1
DATED : July 16, 2002
INVENTOR(S) : Koichi Oya

It is certified that error appears in the above-identified patent and that said Letters Patent is hereby corrected as shown below:

Column 2,
Lines 32 and 33, "10⁻23" should read -- $10^{-23}$ --
Line 36, "ci" should read -- $C_i$ --, and "∼" should read -- ≈ --.
Line 37, after "$^{10)}$" insert -- ≈ --.
Line 43, "10 $^{31\ 23}$" should read -- $10^{-23}$ --.

Column 4,
Line 46, "SIN" should read -- S/N --.

Signed and Sealed this

Eleventh Day of February, 2003

JAMES E. ROGAN
*Director of the United States Patent and Trademark Office*